(12) United States Patent
Wang et al.

(10) Patent No.: US 11,626,109 B2
(45) Date of Patent: Apr. 11, 2023

(54) VOICE RECOGNITION WITH NOISE SUPRESSION FUNCTION BASED ON SOUND SOURCE DIRECTION AND LOCATION

(71) Applicant: AUTOMOTIVE RESEARCH & TESTING CENTER, Changhua County (TW)

(72) Inventors: Yu-Xiang Wang, Changhua County (TW); Chih-Neng Liang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 40 days.

(21) Appl. No.: 17/237,462

(22) Filed: Apr. 22, 2021

(65) Prior Publication Data
US 2022/0343907 A1     Oct. 27, 2022

(51) Int. Cl.
*G10L 15/20*  (2006.01)
*G10L 15/22*  (2006.01)
*G10L 21/0232*  (2013.01)
*G10L 25/84*  (2013.01)

(52) U.S. Cl.
CPC ............. *G10L 15/20* (2013.01); *G10L 15/22* (2013.01); *G10L 21/0232* (2013.01); *G10L 25/84* (2013.01)

(58) Field of Classification Search
CPC ........................... G10L 15/20; G10L 21/0208
See application file for complete search history.

(56) References Cited

U.S. PATENT DOCUMENTS

| | | | |
|---|---|---|---|
| 2002/0101505 A1* | 8/2002 | Gutta | H04N 7/15 348/E7.083 |
| 2016/0125876 A1* | 5/2016 | Schroeter | G10L 15/20 704/226 |
| 2016/0284349 A1* | 9/2016 | Ravindran | G10L 15/285 |
| 2018/0090134 A1* | 3/2018 | Miller | G10L 21/0364 |

* cited by examiner

*Primary Examiner* — Jialong He
(74) *Attorney, Agent, or Firm* — Rosenberg, Klein & Lee

(57) ABSTRACT

A voice recognition device includes at least one position retrieving device, a directional voice receiving device, a noise suppressor, and a voice recognition processor. The position retrieving device is sequentially coupled to the directional voice receiving device, the noise suppressor, and the voice recognition processor. The position retrieving device retrieves the physical voice position of a voice source and outputs the voice position to the directional voice receiving device. The directional voice receiving device receives a voice signal generated by the voice source according to the voice position. The noise suppressor eliminates the noise of the voice signal to generate a voice recognition signal based on noise model corresponding to the voice position. The voice recognition processor receives the voice recognition signal and generates an operating signal based on the voice recognition signal.

8 Claims, 9 Drawing Sheets

VOICE RECOGNITION WITH NOISE SUPRESSION FUNCTION BASED ON SOUND SOURCE DIRECTION AND LOCATION

BACKGROUND OF THE INVENTION

Field of the Invention

The present invention relates to a recognition device, particularly to a voice recognition device.

Description of the Related Art

As the voice recognition function becomes more mature, various multimedia devices use voice recognition devices as input devices, such as smart assistants for mobile phones, voice control devices for vehicles, and smart home appliances. Multimedia devices have added new colors to technological life in a new way. Users can directly interact with the device without using buttons or touches.

At present, most of voice recognition systems are applied to personalization devices. The devices can use directional microphones or limit the range and situation of receiving voices to achieve the better effect of receiving and recognizing voices. However, in a more complex environment or a long distance from the microphone, such as in a vehicle, the personalization device is easily affected by noise or audio feedback. If the voice recognition system is applied to a public device, the public device will have operational interference. For example, when the first user needs to continuously interact with the public device, the first user will have bad human-computer interaction experience if the second user intentionally or unintentionally generates a voice signal to compete for the right to operate the public device. In a noisy environment, the voice recognition rate is lower and the voice recognition system is difficultly controlled without limiting the range of receiving voices and moving the position of the user. Presently, the common voice recognition function in vehicles is performed with Android Auto system. By saying OK Google or pressing the voice command button on the steering wheel, the voice recognition function is performed. Most of voice recognition functions in vehicles are used for driving requirements, such as making phone calls, navigating, playing music, or controlling constant temperature systems. However, these requirements are uni-directional. Besides, the requirements are not performed for a long time. Most of the central control systems of commercial vehicles directly use non-directional microphones. Thus, the effect of receiving voices is easily affected by the feedback phenomena of speakers and noise interference. If the central control systems use directional microphones in the market, it will be more difficult for passengers in other locations to operate the central control system except for a driver. Nowadays, there are many voice receiving products for conferences. In order to satisfy the requirement for receiving voices in conferences, the voice receiving products are 360-degree omnidirectional. Most of the voice receiving products are implemented with high-sensitivity microphones. The purpose of the microphones is to accurately receive the voices of all participants in a conference room. The devices are used to filter out noise and keep voices clear. After receiving voices, digital noise reduction (DNR), voice gain control, or other related methods are performed to increase the strength of human voices and the ability to receive voices. However, in order to receive the voices of all participants as much as possible, directional voices receiving devices are not required. The existing products neither receive voices along the direction of an individual user nor particularly suppress other voices.

To overcome the abovementioned problems, the present invention provides a voice recognition device, so as to solve the afore-mentioned problems of the prior art.

SUMMARY OF THE INVENTION

The present invention provides a voice recognition device, which reduces a frequency of competing for a right to operate a public device and improves an operability of the public device when a voice signal controls the public device. In a complex and closed environment, the voice recognition device may improve voice receiving quality, voice receiving directionality and noise reducing function to enhance voice recognizing accuracy.

In an embodiment of the present invention, a voice recognition device includes at least one position retrieving device, a directional voice receiving device, a noise suppressor, and a voice recognition processor. The position retrieving device corresponds to at least one triggering condition. When a voice source satisfies with the at least one triggering condition, the at least one position retrieving device retrieves and outputs a physical voice position of the voice source. The directional voice receiving device is coupled to the at least one position retrieving device and configured to receive the physical voice position. The directional voice receiving device is configured to receive a voice signal generated by the voice source according to the physical voice position. The noise suppressor is coupled to the at least one position retrieving device and the directional voice receiving device. The noise suppressor includes noise models respectively corresponding to voice generating positions. The voice generating positions includes the physical voice position. The noise suppressor is configured to receive the voice signal and the physical voice position. The noise suppressor is configured to eliminate noise of the voice signal to generate a voice recognition signal based on the noise model corresponding to the physical voice position. The voice recognition processor is coupled to the noise suppressor and configured to receive the voice recognition signal and generate an operating signal based on the voice recognition signal.

In an embodiment of the present invention, the voice recognition device further includes a coordinate transformer. The coordinate transformer is coupled to the at least one position retrieving device, the directional voice receiving device, and the noise suppressor and configured to receive the physical voice position. The coordinate transformer is configured to transform a coordinate system of the physical voice position into a coordinate system corresponding to the directional voice receiving device and the noise suppressor and transmit a transformed physical voice position to the directional voice receiving device and the noise suppressor.

In an embodiment of the present invention, the at least one position retrieving device includes a plurality of position retrieving devices. The at least one triggering condition includes a plurality of triggering conditions. The plurality of triggering conditions respectively corresponds to the plurality of position retrieving devices. When the voice source sequentially satisfies with the plurality of triggering conditions, the physical voice position is retrieved and outputted by the at least one position retrieving device which corresponds to the at least one triggering condition satisfied most early.

In an embodiment of the present invention, the at least one position retrieving device is an image positioning module.

When the image positioning module retrieves an image having a hand raising gesture of a user, the at least one triggering condition is satisfied, the user is used as the voice source, and the physical position of the user is used as the physical voice position.

In an embodiment of the present invention, the at least one position retrieving device is a voice positioning module. When the voice positioning module receives a triggering voice generated by the voice source at different positions, the at least one triggering condition is satisfied. The voice positioning module is configured to retrieve different time points of receiving the triggering voice at the different positions and retrieve the physical voice position according to the different time points.

In an embodiment of the present invention, the position retrieving device includes a touch display panel and an application processor. The touch display panel is configured to display an operating interface of an application program. The operating interface includes an image corresponding to the physical voice position. The application processor is coupled to the touch display panel, the noise suppressor, and the directional voice receiving device and installed with the application program. When the position of the touch display panel corresponding to the image is pressed, the at least one triggering condition is satisfied and the application processor obtains and outputs the physical voice position.

In an embodiment of the present invention, the directional voice receiving device includes a microphone array and an audio processor. The microphone array is configured to receive the voice signal at different positions. The audio processor is coupled to the microphone array, the at least one position retrieving device, and the noise suppressor. The audio processor includes sets of shifting periods respectively corresponding to the voice generating positions. The audio processor is configured to receive the physical voice position and shift time points of receiving waveforms of the voice signal at the different positions to the same time point according to the physical voice position and the corresponding set of shifting periods. The audio processor is configured to superimpose the waveforms of the voice signal at the same time point to generate an enhanced voice signal and transmit the enhanced voice signal to the noise suppressor.

In an embodiment of the present invention, the directional voice receiving device includes a directional voice receiver and an automatic rotation platform. The directional voice receiver is coupled to the noise suppressor. The automatic rotation platform is coupled to the at least one position retrieving device. The automatic rotation platform supports the directional voice receiver. The automatic rotation platform is configured to receive the physical voice position, control the voice receiving direction of the directional voice receiver toward the physical voice position, receive the voice signal, and transmit the voice signal to the noise suppressor.

In an embodiment of the present invention, the voice recognition processor is coupled to the at least one position retrieving device and the directional voice receiving device. When the voice recognition processor does not receive the voice recognition signal for a preset period, the voice recognition processor controls the at least one position retrieving device to stop obtaining the physical voice position, controls the directional voice receiving device to stop receiving the physical voice position and generating the voice signal, and controls the at least one position retrieving device and the directional voice receiving device to operate in a standby state.

In an embodiment of the present invention, a voice recognition device includes a plurality of voice receivers, an audio processor, a noise suppressor, and a voice recognition processor. The plurality of voice receivers are configured to receive a voice signal generated by a voice source at different positions. The audio processor is coupled to the plurality of voice receivers. The audio processor includes sets of shifting periods respectively corresponding to voice generating positions. The audio processor is configured to obtain time points of receiving waveforms of the voice signal at the different positions and obtain the physical voice position of the voice source according to the time points. The voice generating positions include the physical voice position. The audio processor is configured to shift the time points of receiving waveforms of the voice signal at the different positions to the same time point according to the physical voice position and the corresponding set of shifting periods. The audio processor is configured to superimpose the waveforms of the voice signal at the same time point to generate an enhanced voice signal. The noise suppressor is coupled to the audio processor. The noise suppressor includes noise models respectively corresponding to the voice generating positions. The noise suppressor is configured to receive the enhanced voice signal and the physical voice position and eliminate noise of the enhanced voice signal to generate a voice recognition signal based on the noise model corresponding to the physical voice position. The voice recognition processor is coupled to the noise suppressor and configured to receive the voice recognition signal and generate an operating signal based on the voice recognition signal.

In an embodiment of the present invention, the voice recognition processor is coupled to the audio processor. When the voice recognition processor does not receive the voice recognition signal for a preset period, the voice recognition processor controls the audio processor to stop obtaining the physical voice position and generating the enhanced voice signal and to operate in a standby state.

To sum up, the voice recognition device obtains the physical voice position of the voice source and outputs the physical voice position to the directional voice receiving device, such that the directional voice receiving device receives the voice signal generated by the voice source according to the voice position. This way, the voice recognition device reduces the frequency of competing for the right to operate the public device and improves the operability of the public device when the voice signal controls the public device. In a complex and closed environment, the voice recognition device may improve the voice receiving quality, voice receiving directionality and noise reducing function to enhance the voice recognizing accuracy.

Below, the embodiments are described in detail in cooperation with the drawings to make easily understood the technical contents, characteristics and accomplishments of the present invention.

DETAILED DESCRIPTION OF THE INVENTION

Figure 1:
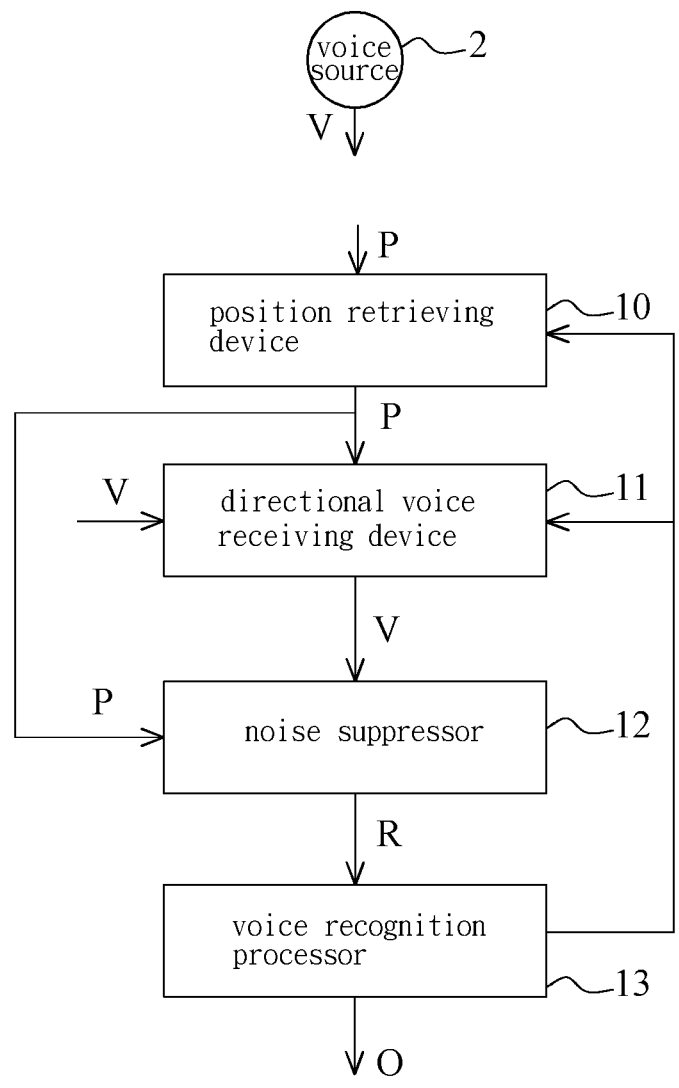
FIG. 1 is a schematic diagram illustrating a voice recognition device according to a first embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, particular components, structures, and features in one or more embodiments can be combined in an appropriate manner.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

FIG. 1 is a schematic diagram illustrating a voice recognition device according to a first embodiment of the present invention. Referring to FIG. 1, the first embodiment of the voice recognition device is introduced as follows. The voice recognition device 1 includes at least one position retrieving device 10, a directional voice receiving device 11, a noise suppressor 12, and a voice recognition processor 13. The position retrieving device 10, the directional voice receiving device 11, the noise suppressor 12, and the voice recognition processor 13 include hardware. The directional voice receiving device 11 is coupled to the position retrieving device 10. The noise suppressor 12 is coupled to the position retrieving device 10 and the directional voice receiving device 11. The voice recognition processor 13 is coupled to the noise suppressor 12. The at least one position retrieving device 10 corresponds to at least one triggering condition. For clarity and convenience, the first embodiment exemplifies one position retrieving device 10 and one triggering condition. Besides, the position retrieving device 10, the directional voice receiving device 11, the noise suppressor 12 may use the same coordinate system.

The operation of the first embodiment is introduced as follows. When a voice source 2 satisfies with the triggering condition, the position retrieving device 10 retrieves and outputs the physical voice position P of the voice source 2. The directional voice receiving device 11 receives the physical voice position P and receives a voice signal V generated by the voice source 2 according to the physical voice position P. The voice signal V includes operating voices corresponding to an operating right. For example, the directional voice receiving device 11 may be implemented with a beamforming module. The beamforming module may enhance the voice signal V corresponding to the direction of the physical voice position P and weaken the voice signal V corresponding to the other directions. The noise suppressor 12 includes noise models respectively corresponding to voice generating positions. The voice generating positions includes the physical voice position P. Thus, the noise suppressor 12 receives the voice signal V and the physical voice position P. The noise suppressor 12 eliminates the noise of the voice signal V to generate a voice recognition signal R based on the noise model corresponding to the physical voice position P. The noise suppressor 12 may use an adaptive filter algorithm and a finite impulse response (FIR) filter to eliminate the noise of the voice signal V, thereby increasing the noise suppressing efficiency. The voice recognition processor 13 receives the voice recognition signal R and generates an operating signal O based on the voice recognition signal R. The operating signal O may be used to control a public device. The position retrieving device 10 obtains the physical voice position P of the voice source 2 and outputs the physical voice position P to the directional voice receiving device 11, such that the directional voice receiving device 11 receives the voice signal V generated by the voice source 2 according to the physical voice position P. This way, the voice recognition device 1 reduces a frequency of competing for a right to operate the public device and improves an operability of the public device when the voice signal V controls the public device. In a complex and closed environment, the voice recognition device 1 may improve voice receiving quality, voice receiving directionality and noise reducing function to enhance voice recognizing accuracy.

In some embodiments of the present invention, the voice recognition processor 13 may be coupled to the position retrieving device 10 and the directional voice receiving device 11. The voice recognition processor 13 does not receive the voice recognition signal R for a preset period, which represents a fact that the operation of the voice recognition device 1 ends and releases the operating right. When the voice recognition processor 13 does not receive the voice recognition signal R for the preset period, the voice recognition processor 13 controls the position retrieving device 10 to stop obtaining the physical voice position P, controls the directional voice receiving device 11 to stop receiving the physical voice position P and generating the voice signal V, and controls the position retrieving device 10 and the directional voice receiving device 11 to operate in a standby state, until the position retrieving device 10 retrieves a new physical position of a new voice source.

Figure 2:
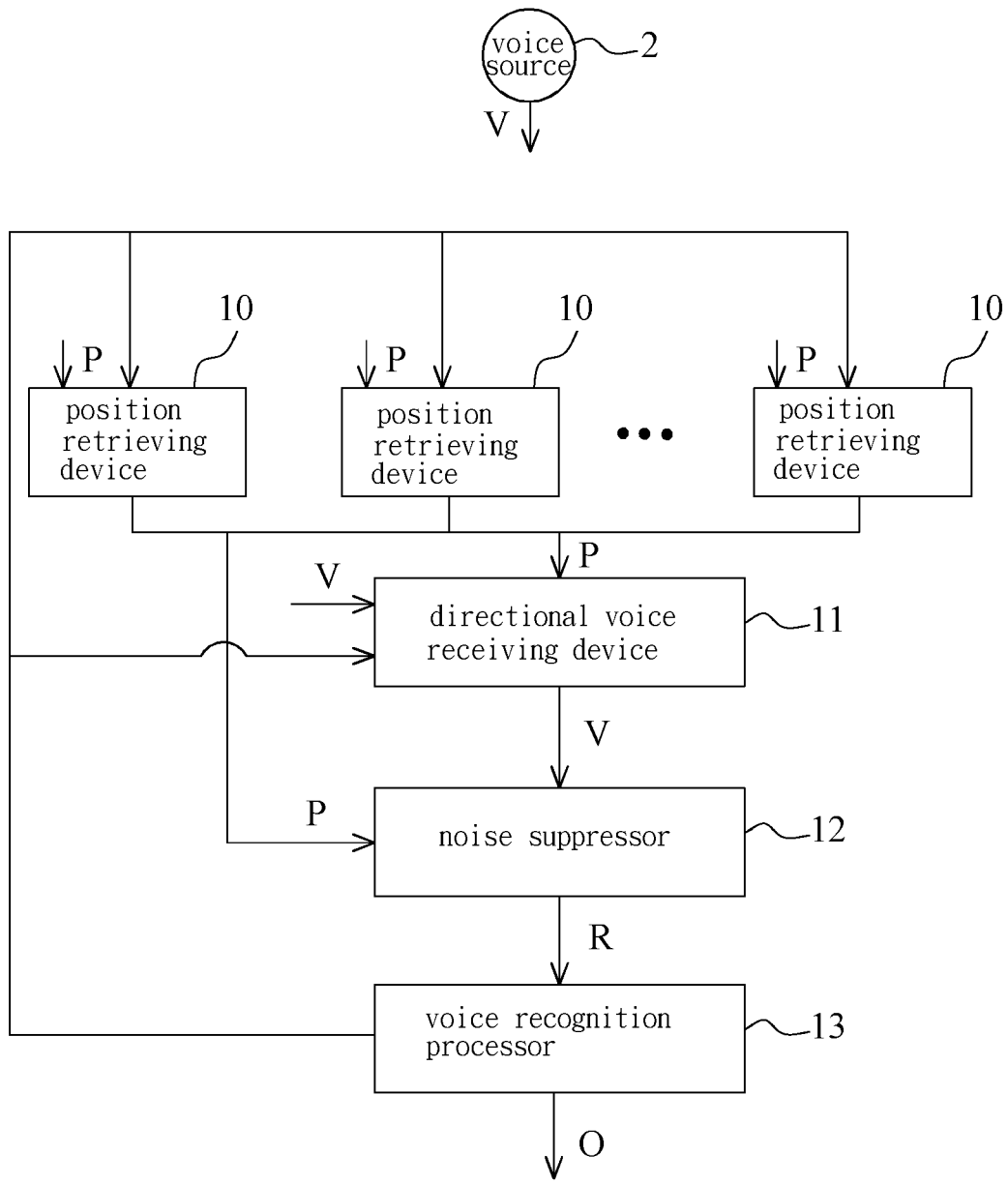
FIG. 2 is a schematic diagram illustrating a voice recognition device according to a second embodiment of the present invention.

FIG. 2 is a schematic diagram illustrating a voice recognition device according to a second embodiment of the present invention. Referring to FIG. 2, the second embodiment of the voice recognition device is introduced as follows. The second embodiment is different from the first embodiment in the numbers of the position retrieving device 10 and the triggering condition thereof. In the second embodiment, there are a plurality of position retrieving devices 10 and a plurality of triggering conditions. If the voice signal V generated by the voice source 2 is blocked, a single triggering condition will not be satisfied. In order to avoid this situation, the second embodiment uses different triggering conditions, such as a voice related triggering condition, an image related triggering condition, and an application program related triggering condition. The triggering conditions respectively correspond to the position retrieving devices 10. The present invention does not consider a fact that multiple triggering conditions are satisfied. When the voice source 2 sequentially satisfies with the plurality of triggering conditions, the physical voice position P is retrieved and outputted by the position retrieving device 10 which corresponds to the triggering condition satisfied most early.

Figure 3:
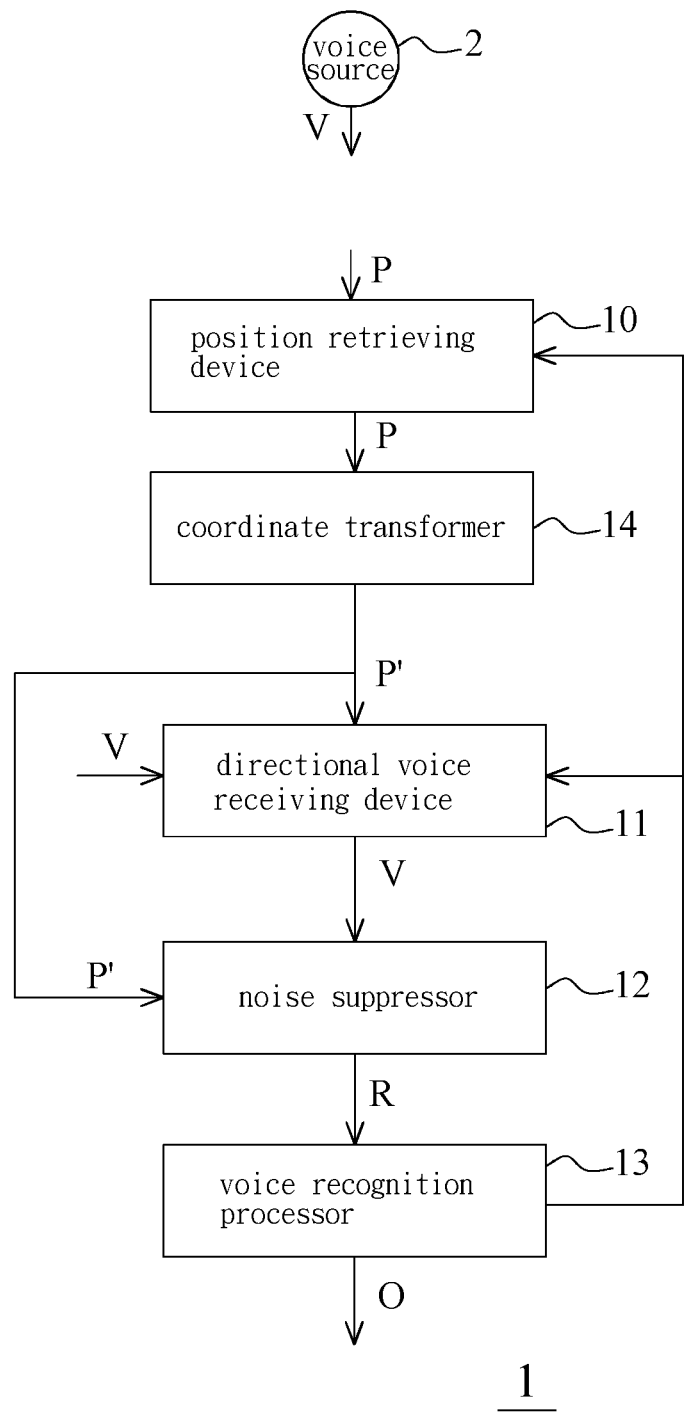
FIG. 3 is a schematic diagram illustrating a voice recognition device according to a third embodiment of the present invention.

FIG. 3 is a schematic diagram illustrating a voice recognition device according to a third embodiment of the present invention. Referring to FIG. 3, the third embodiment of the voice recognition device is introduced as follows. The third embodiment is different from the first embodiment in that the third embodiment further includes a coordinate transformer 14. In the third embodiment, the position retrieving device 10 and the directional voice receiving device 11 may use different coordinate systems, and the directional voice receiving device 11 and the noise suppressor 12 may use the same coordinate system. The coordinate transformer 14 is coupled to the position retrieving device 10, the directional voice receiving device 11, and the noise suppressor 12. The coordinate transformer 14 receives the physical voice position P, transforms the coordinate system of the physical voice position P into the coordinate system corresponding to the directional voice receiving device 11 and the noise suppressor 12 and transmit a transformed physical voice position P' to the directional voice receiving device 11 and the noise suppressor 12. The voice generating positions also include the transformed physical voice position P'. Thus, the directional voice receiving device 11 receives the transformed physical voice position P' and receives the voice signal V generated by the voice source 2 according to the transformed physical voice position P'. The noise suppressor 12 receives the voice signal V and the transformed physical voice position P' and eliminate the noise of the voice signal V to generate a voice recognition signal R based on the noise model corresponding to the transformed physical voice position P'.

In an embodiment of the present invention, the position retrieving device 10 may be an image positioning module and the triggering condition may be an image related triggering condition. When the image positioning module retrieves an image having the specific gesture of a user, such as an image having the hand raising gesture of the user, the image related triggering condition is satisfied. Thus, the user is used as the voice source 2, and the physical position of the user is used as the physical voice position P. For example, the image positioning module may divide the retrieve image into multiple blocks and marks each block with a number. This way, the image positioning module finds and uses the number of the block having the hand raising gesture as the physical voice position P. Alternatively, if the image positioning module includes two lenses, the image positioning module will use two lenses to position the user to obtain the three-dimensional coordinates of the user and use the three-dimensional coordinates as the physical voice position P.

In another embodiment of the present invention, the position retrieving device 10 may be a voice positioning module and the triggering condition may be a voice related triggering condition. When the voice positioning module receives a triggering voice generated by the voice source 2 at different positions, the voice related triggering condition is satisfied. The triggering voice may be the same as or different from the voice signal V. The voice positioning module retrieves different time points of receiving the triggering voice at the different positions. Since the different time points of receiving the triggering voice respectively represent distances between the voice source 2 and the different positions of the voice positioning module, the voice positioning module retrieves the physical voice position P according to the different time points of receiving the triggering voice. For example, the voice positioning module may include a stereo microphone array and a voice processor coupled to stereo microphone array. The stereo microphone array includes multiple microphones. Since all the microphones are arranged at different positions, all the microphones respectively receive the triggering voice generated by the voice source 2 at different time points. The voice processor calculates the three-dimensional coordinates of the voice source 2 based on the time intervals among the different time points and the positions of all the microphones. The voice processor uses the three-dimensional coordinates as the physical voice position P.

Figure 4:
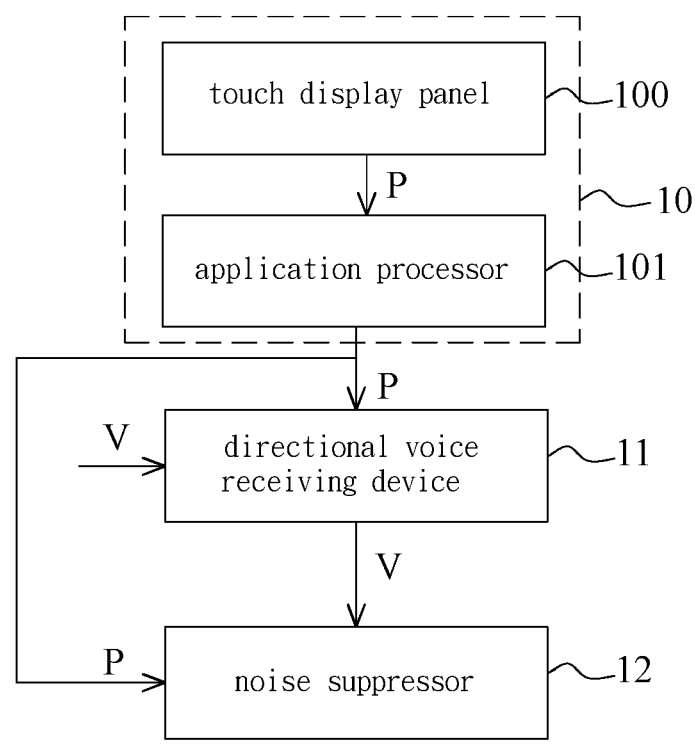
FIG. 4 is a schematic diagram illustrating a position retrieving device, a directional voice receiving device, and a noise suppressor according to an embodiment of the present invention.

FIG. 4 is a schematic diagram illustrating a position retrieving device 10, a directional voice receiving device 11, and a noise suppressor 12 according to an embodiment of the present invention. Referring to FIG. 4, the position retrieving device 10 may include a touch display panel 100 and an application processor 101. The application processor 101 is coupled to the touch display panel 100, the noise suppressor 12, and the directional voice receiving device 11. The touch display panel 100 displays an operating interface of an application program. The operating interface includes an image corresponding to the physical voice position P. The application processor 101 is installed with the application program. Thus, the triggering condition is an application program related triggering condition. When the position of the touch display panel 100 corresponding to the image is pressed, the application program related triggering condition is satisfied and the application processor 101 obtains and outputs the physical voice position P. In addition, the circuit in FIG. 4 will be used in the embodiment of FIG. 1 or the other embodiments of the present invention, but the present invention is not limited thereto. When the circuit in FIG. 4 is applied to the embodiment of FIG. 3, the application processor 101 is coupled to the coordinate transformer 14.

Figure 5:
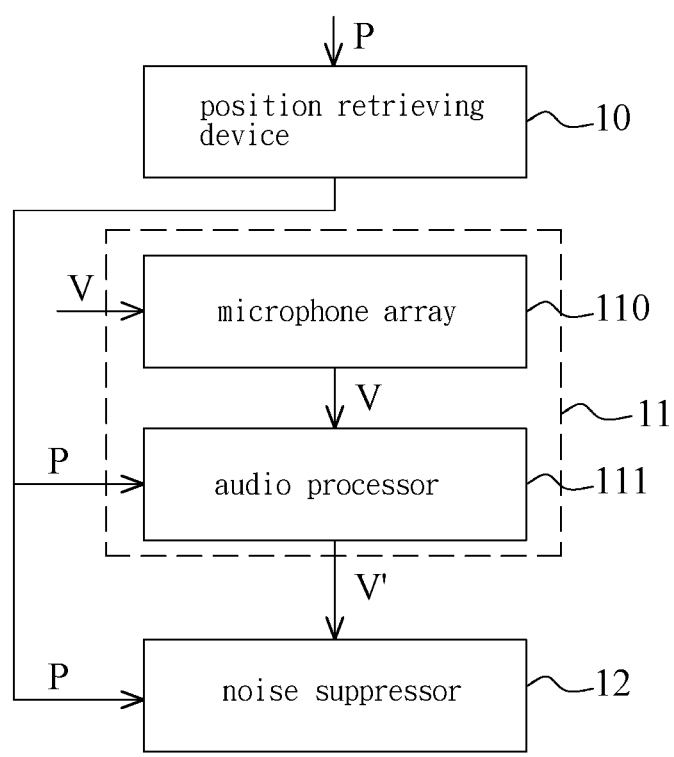
FIG. 5 is a schematic diagram illustrating a position retrieving device, a directional voice receiving device, and a noise suppressor according to another embodiment of the present invention.

FIG. 5 is a schematic diagram illustrating a position retrieving device 10, a directional voice receiving device 11, and a noise suppressor 12 according to another embodiment of the present invention. Referring to FIG. 5, the directional voice receiving device 11 may include a microphone array 110 and an audio processor 111. The microphone array 110 receives the voice signal V at different positions. The audio processor 111 is coupled to the microphone array 110, the position retrieving device 10, and the noise suppressor 12. The audio processor 111 includes sets of shifting periods respectively corresponding to the voice generating positions. The audio processor 111 receives the physical voice position P and shifts time points of receiving the waveforms of the voice signal V at the different positions to the same time point according to the physical voice position P and the corresponding set of shifting periods. The audio processor 111 superimposes the waveforms of the voice signal V at the same time point to generate an enhanced voice signal V' and transmit the enhanced voice signal V' to the noise suppressor 12. The noise suppressor 12 eliminates the noise of the enhanced voice signal V' to generate a voice recognition signal R based on the noise model corresponding to the physical voice position P. In addition, the circuit in FIG. 5 will be used in the embodiment of FIG. 1 or the other embodiments of the present invention, but the present invention is not limited thereto. When the circuit in FIG. 5 is applied to the embodiment of FIG. 3, the audio processor 111 and the noise suppressor 12 are coupled to the coordinate transformer 14 and the physical voice position P is replaced with the transformed physical voice position P'. When the circuit in FIG. 5 is applied to the embodiment of FIG. 4, the audio processor 111 is coupled to the application processor 101.

Figure 6:
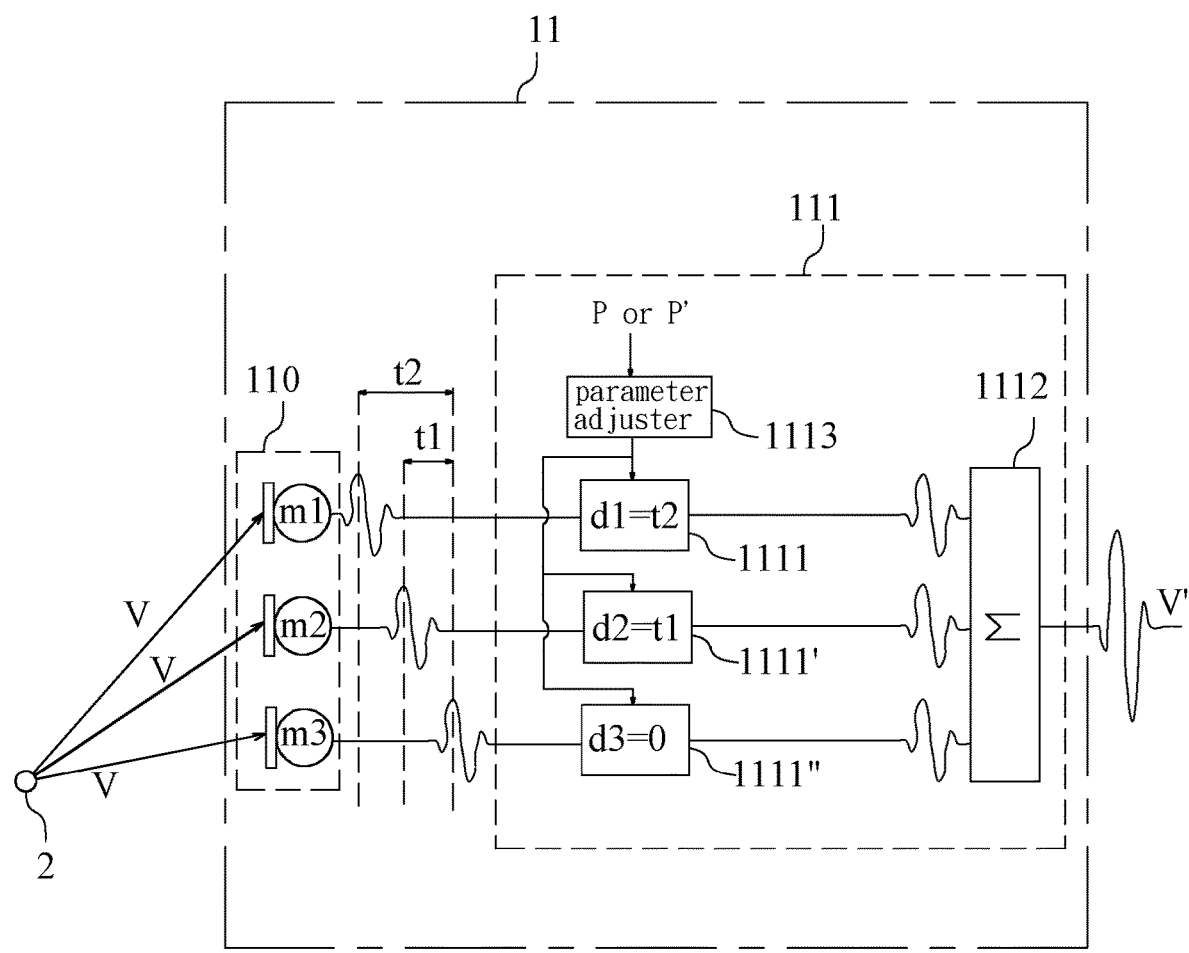
FIG. 6 is a schematic diagram illustrating a voice source and a directional voice receiving device according to an embodiment of the present invention.

FIG. 6 is a schematic diagram illustrating a voice source 2 and a directional voice receiving device 11 according to an embodiment of the present invention. Referring to FIG. 6, the microphone array 110 may include microphones m1, m2, and m3 and the audio processor 111 may include time shifters 1111, 1111', and 1111", an average calculator 1112, and a parameter adjuster 1113. The time shifters 1111, 1111', and 1111" are respectively coupled to the microphones m1, m2, and m3. The parameter adjuster 1113 is coupled to the time shifters 1111, 1111', and 1111". The time shifters 1111, 1111', and 1111" are coupled to the average calculator 1112. The parameter adjuster 1113 includes the sets of shifting periods respectively corresponding to the voice generating positions. Since distances between the voice source 2 and the microphones m1, m2, and m3 are different, the microphones m1, m2, and m3 receive the voice signal V at different time points. For example, the time interval between the time points when the microphones m2 and m3 receive the voice signal V is t1 and the time interval between the time points when the microphones m1 and m3 receive the voice signal V is t2. Assume that the transformed physical voice position P' or the voice position P corresponds to the microphone m3. This represents that the microphone m3 is closest to the voice source 2. The parameter adjuster 1113 respectively adjusts the shifting periods d1, d2, and d3 of the time shifters 1111, 1111', and 1111" to t2, t1, and 0. As a result, the time points of waveforms of the voice signal V received by the microphones m1, m2, and m3 are shifted to the time point when the microphone m3 receives the voice signal V. Then, the average calculator 1112 receives the voice signal V from the time shifters 1111, 1111', and 1111". The average calculator 1112 adds and averages the voice signal V to generate the enhanced voice signal V'. In addition, the circuit in FIG. 6 will be used in the embodiment of FIG. 1 or the other embodiments of the present invention, but the present invention is not limited thereto. When the circuit in FIG. 6 is applied to the embodiment of FIG. 1, the parameter adjuster 1113 is coupled to the position retrieving device 10. When the circuit in FIG. 6 is applied to the embodiment of FIG. 3, the parameter adjuster 1113 is coupled to the coordinate transformer 14. When the circuit in FIG. 6 is applied to the embodiment of FIG. 4, the parameter adjuster 1113 is coupled to the application processor 101.

Figure 7:
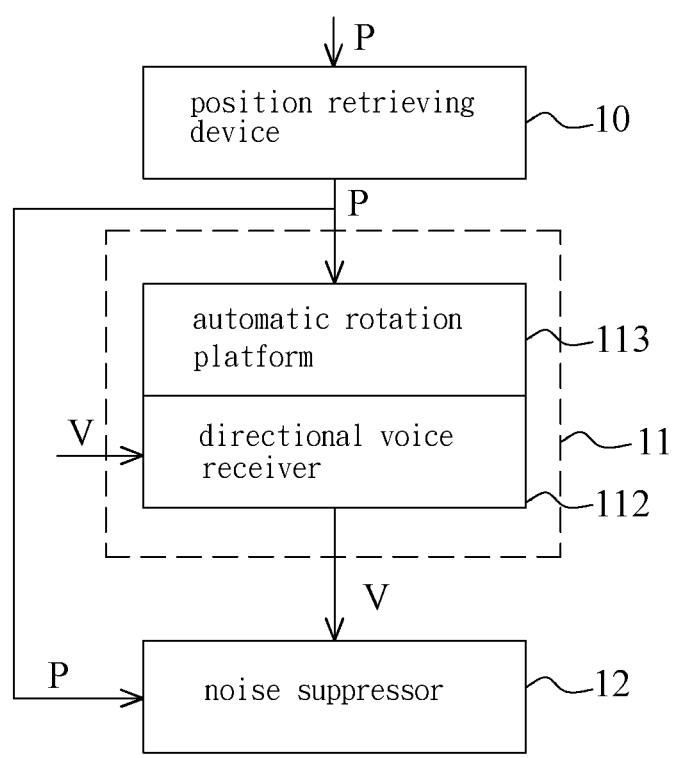
FIG. 7 is a schematic diagram illustrating a position retrieving device, a directional voice receiving device, and a noise suppressor according to further embodiment of the present invention.

FIG. 7 is a schematic diagram illustrating a position retrieving device 10, a directional voice receiving device 11, and a noise suppressor 12 according to further embodiment of the present invention. Referring to FIG. 7, the directional voice receiving device 11 may include a directional voice receiver 112 and an automatic rotation platform 113. The directional voice receiver 112 is coupled to the noise suppressor 12. The automatic rotation platform 113 is coupled to the position retrieving device 10. The automatic rotation platform 113 supports the directional voice receiver 112. The automatic rotation platform 113 receives the physical voice position P, controls the voice receiving direction of the directional voice receiver 112 toward the physical voice position P, receives the voice signal V, and transmits the voice signal V to the noise suppressor 12. In addition, the circuit in FIG. 7 will be used in the embodiment of FIG. 1 or the other embodiments of the present invention, but the present invention is not limited thereto. When the circuit in FIG. 7 is applied to the embodiment of FIG. 3, the automatic rotation platform 113 and the noise suppressor 12 are coupled to the coordinate transformer 14 and the physical voice position P is replaced with the transformed physical voice position P'. When the circuit in FIG. 7 is applied to the embodiment of FIG. 4, the automatic rotation platform 113 is coupled to the application processor 101.

Figure 8:
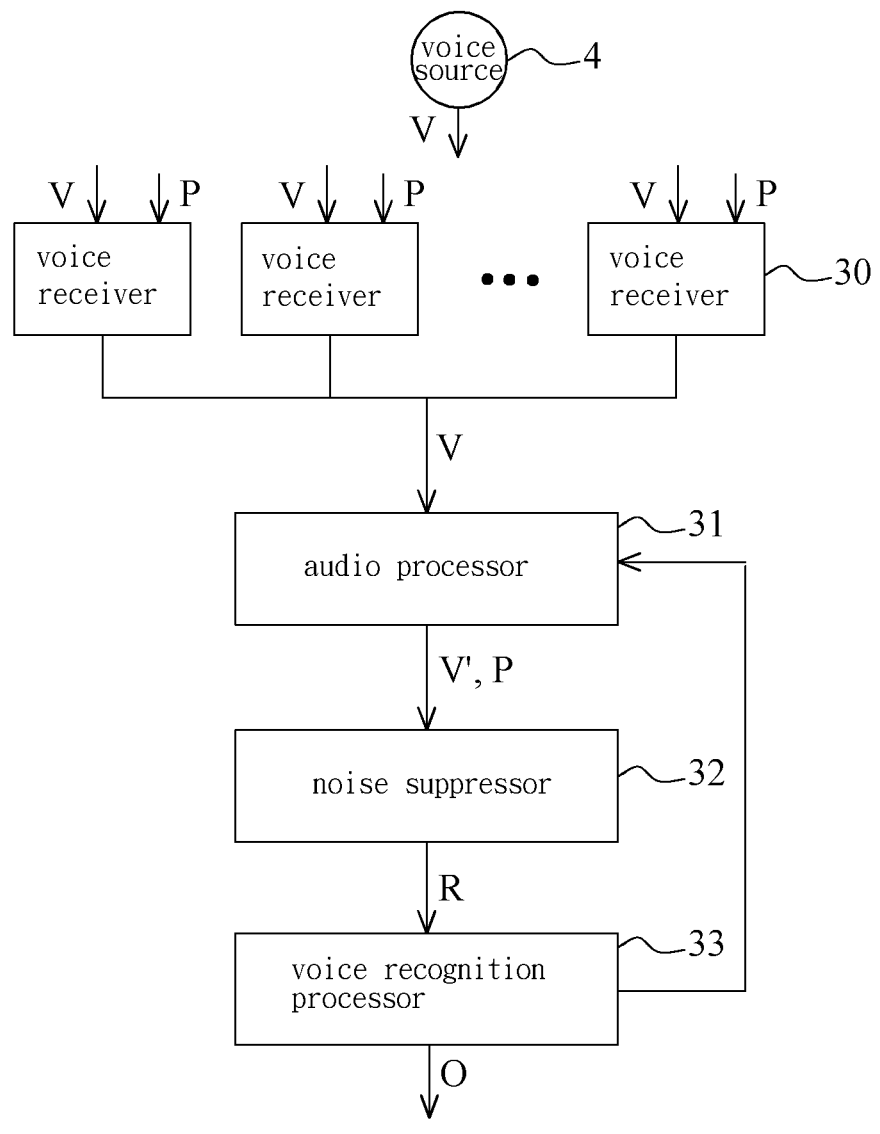
FIG. 8 is a schematic diagram illustrating a voice recognition device according to a fourth embodiment of the present invention.

FIG. 8 is a schematic diagram illustrating a voice recognition device according to a fourth embodiment of the present invention. Referring to FIG. 8, the fourth embodiment of the voice recognition device is introduced as follows. The voice recognition device 3 includes a plurality of voice receivers 30, an audio processor 31, a noise suppressor 32, and a voice recognition processor 33. The voice receiver 30, the audio processor 31, the noise suppressor 32, and the voice recognition processor 33 include hardware. The audio processor 31 is coupled to all the voice receivers 30. The audio processor 31 includes the sets of shifting periods respectively corresponding to voice generating positions. The noise suppressor 32 is coupled to the audio processor 31. The noise suppressor 32 includes noise models respectively corresponding to the voice generating positions. The voice recognition processor 33 is coupled to the noise suppressor 32. The audio processor 31 and the noise suppressor 32 use the same coordinate system.

The operation of the fourth embodiment is introduced as follows. All the voice receivers 30 receive a voice signal V generated by a voice source 4 at different positions. The voice signal V includes operating voices corresponding to an operating right. Since distances between all the voice receivers 30 and the voice source 4 are different, all the voice receivers 30 receive the voice signal V at different time points. The audio processor 31 obtains the time points of receiving waveforms of the voice signal V at the different positions and obtains the physical voice position P of the voice source 4 according to the time points. The voice generating positions include the physical voice position P. The audio processor 31 shifts the time points of receiving waveforms of the voice signal V at the different positions to the same time point according to the physical voice position P and the corresponding set of shifting periods. The audio processor 31 superimposes the waveforms of the voice signal V at the same time point to generate an enhanced voice signal V'. The noise suppressor 32 receives the enhanced voice signal V' and the physical voice position P and eliminates the noise of the enhanced voice signal V' to generate a voice recognition signal R based on the noise model corresponding to the physical voice position P. The noise suppressor 32 may use an adaptive filter algorithm and a finite impulse response (FIR), thereby increasing the noise suppressing efficiency. The voice recognition processor 33 receives the voice recognition signal R and generates an operating signal O based on the voice recognition signal R. The operating signal O may be used to control a public device. The audio processor 31 obtains the physical voice position P of the voice source 4, such that the audio processor 31 generates the enhanced voice signal V' according to the physical voice position P. This way, the voice recognition device 3 reduces the frequency of competing for the right to operate the public device and improves the operability of the public device when the voice signal V controls the public device. In a complex and closed environment, the voice recognition device 3 may improve the voice receiving quality, voice receiving directionality and noise reducing function to enhance the voice recognizing accuracy.

In some embodiments of the present invention, the voice recognition processor 33 may be coupled to the audio processor 31. The voice recognition processor 33 does not receive the voice recognition signal R for a preset period, which represents a fact that the operation of the voice recognition device 3 ends to release the operating right. When the voice recognition processor 33 does not receive the voice recognition signal R for the preset period, the voice recognition processor 33 controls the audio processor 31 to stop obtaining the physical voice position P and generating the enhanced voice signal V' and to operate in a standby state, until the voice receivers 30 receive a new voice signal.

Figure 9:
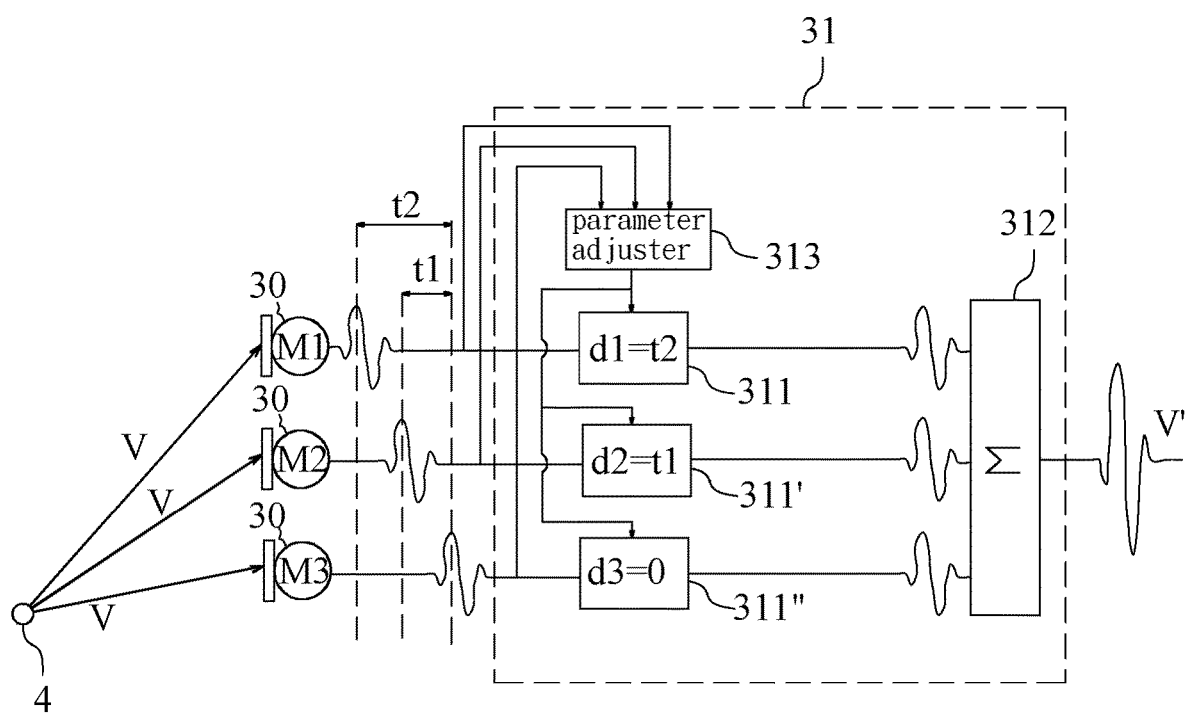
FIG. 9 is a schematic diagram illustrating a voice source, voice receivers, and audio processor according to an embodiment of the present invention.

FIG. 9 is a schematic diagram illustrating a voice source 4, voice receivers 30, and audio processor 31 according to an embodiment of the present invention. Referring to FIG. 8 and FIG. 9, the voice receivers 30 are implemented with microphones M1, M2, and M3. The audio processor may include time shifters 311, 311', and 311", an average calculator 312, and a parameter adjuster 313. The time shifters 311, 311', and 311" are respectively coupled to the microphones M1, M2, and M3. The parameter adjuster 313 is coupled to the time shifters 311, 311', and 311" and the microphones M1, M2, and M3. The time shifters 311, 311', and 311" are coupled to the average calculator 312. The parameter adjuster 313 includes the sets of shifting periods respectively corresponding to the voice generating positions. Since distances between the voice source 4 and the microphones M1, M2, and M3 are different, the microphones M1, M2, and M3 receive the voice signal V at different time points. For example, the time interval between the time points when the microphones M2 and M3 receive the voice signal V is t1 and the time interval between the time points when the microphones M1 and M3 receive the voice signal V is t2. Assume that the parameter adjuster 313 detects the physical voice position P corresponding to the microphone M3. This represents that the microphone M3 is closest to the voice source 4. The parameter adjuster 313 respectively adjusts the shifting periods d1, d2, and d3 of the time shifters 311, 311', and 311" to t2, t1, and 0. As a result, the time points of waveforms of the voice signal V received by the microphones M1, M2, and M3 are shifted to the time point when the microphone M3 receives the voice signal V. Then, the average calculator 312 receives the voice signal V from the time shifters 311, 311', and 311". The average calculator 312 adds and averages the voice signal V to generate the enhanced voice signal V'. In addition, the circuit in FIG. 9 will be used in the embodiment of FIG. 8 or the other embodiments of the present invention, but the present invention is not limited thereto.

According to the embodiments provided above, the voice recognition device obtains the physical voice position of the voice source and outputs the physical voice position to the directional voice receiving device, such that the directional voice receiving device receives the voice signal generated by the voice source according to the voice position. This way, the voice recognition device reduces the frequency of competing for the right to operate a public device and improves the operability of the public device when a voice signal controls the public device. In a complex and closed environment, the voice recognition device may improve the voice receiving quality, voice receiving directionality and noise reducing function to enhance the voice recognizing accuracy.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A voice recognition device comprising:
   at least one position retrieving device comprising hardware and corresponding to at least one triggering condition, wherein when a voice source satisfies with the at least one triggering condition, the at least one position retrieving device retrieves and outputs a physical voice position of the voice source;

a directional voice receiving device, comprising hardware, coupled to the at least one position retrieving device and configured to receive the physical voice position, wherein the directional voice receiving device is configured to receive a voice signal generated by the voice source according to the physical voice position;

a noise suppressor, comprising hardware, coupled to the at least one position retrieving device and the directional voice receiving device, wherein the noise suppressor includes noise models respectively corresponding to voice generating positions, the voice generating positions comprises the physical voice position, the noise suppressor is configured to receive the voice signal and the physical voice position, and the noise suppressor is configured to eliminate noise of the voice signal to generate a voice recognition signal based on the noise model corresponding to the physical voice position;

a voice recognition processor, comprising hardware, coupled to the noise suppressor and configured to receive the voice recognition signal and generate an operating signal based on the voice recognition signal; and a coordinate transformer, comprising hardware, coupled to the at least one position retrieving device, the directional voice receiving device, and the noise suppressor and configured to receive the physical voice position, wherein the coordinate transformer is configured to transform a coordinate system of the physical voice position into a coordinate system corresponding to the directional voice receiving device and the noise suppressor and transmit a transformed the physical voice position to the directional voice receiving device and the noise suppressor.

2. The voice recognition device of claim 1, wherein the at least one position retrieving device comprises a plurality of position retrieving devices, the at least one triggering condition comprises a plurality of triggering conditions, the plurality of triggering conditions respectively correspond to the plurality of position retrieving devices, and when the voice source sequentially satisfies with the plurality of triggering conditions, the physical voice position is retrieved and outputted by the at least one position retrieving device which corresponds to the at least one triggering condition satisfied most early.

3. The voice recognition device of claim 1, wherein the at least one position retrieving device is an image positioning module, and when the image positioning module retrieves an image having a hand raising gesture of a user, the at least one triggering condition is satisfied, the user is used as the voice source, and a physical position of the user is used as the physical voice position.

4. The voice recognition device of claim 1, wherein the at least one position retrieving device is a voice positioning module, when the voice positioning module receives a triggering voice generated by the voice source at different positions, the at least one triggering condition is satisfied, and the voice positioning module is configured to retrieve different time points of receiving the triggering voice at the different positions and retrieve the physical voice position according to the different time points.

5. The voice recognition device of claim 1, wherein the at least one position retrieving device comprises:

a touch display panel configured to display an operating interface of an application program, wherein the operating interface has an image corresponding to the physical voice position; and an application processor coupled to the touch display panel, the noise suppressor, and the directional voice receiving device and installed with the application program, wherein when a position of the touch display panel corresponding to the image is pressed, the at least one triggering condition is satisfied and the application processor obtains and outputs the physical voice position.

6. The voice recognition device of claim 1, wherein the directional voice receiving device comprises:

a microphone array configured to receive the voice signal at different positions; and an audio processor, coupled to the microphone array, the at least one position retrieving device, and the noise suppressor, storing sets of shifting periods respectively corresponding to the voice generating positions, wherein the audio processor is configured to receive the physical voice position and shift time points of receiving waveforms of the voice signal at the different positions to a same time point according to the physical voice position and a corresponding the set of shifting periods, and the audio processor is configured to superimpose the waveforms of the voice signal at the same time point to generate an enhanced the voice signal and transmit the enhanced voice signal to the noise suppressor.

7. The voice recognition device of claim 1, wherein the directional voice receiving device comprises:

a directional voice receiver coupled to the noise suppressor; and an automatic rotation platform, coupled to the at least one position retrieving device, supporting the directional voice receiver, wherein the automatic rotation platform is configured to receive the physical voice position, control a voice receiving direction of the directional voice receiver toward the physical voice position, receive the voice signal, and transmit the voice signal to the noise suppressor.

8. The voice recognition device of claim 1, wherein the voice recognition processor is coupled to the at least one position retrieving device and the directional voice receiving device, and when the voice recognition processor does not receive the voice recognition signal for a preset period, the voice recognition processor controls the at least one position retrieving device to stop obtaining the physical voice position, controls the directional voice receiving device to stop receiving the physical voice position and generating the voice signal, and controls the at least one position retrieving device and the directional voice receiving device to operate in a standby state.

* * * * *